United States Patent [19]
Griffith

[11] Patent Number: 5,449,553
[45] Date of Patent: Sep. 12, 1995

[54] NONTOXIC ANTIFOULING SYSTEMS

[75] Inventor: James R. Griffith, Lanham, Md.

[73] Assignee: The United States of America as represented by the Secretary of the Navy, Washington, D.C.

[21] Appl. No.: 219,224

[22] Filed: Mar. 28, 1994

Related U.S. Application Data

[63] Continuation of Ser. No. 847,401, Mar. 6, 1992.

[51] Int. Cl.$^6$ .............................................. B32B 25/20
[52] U.S. Cl. ........................... 428/332; 428/334; 428/335; 428/336; 428/446; 428/447; 428/448; 428/450; 428/451; 428/452
[58] Field of Search ............... 428/332, 334, 335, 336, 428/447, 448, 446, 450, 451, 452

[56] References Cited

U.S. PATENT DOCUMENTS

| | | | |
|---|---|---|---|
| 3,627,863 | 12/1971 | Faibanks | 264/103 |
| 3,776,875 | 12/1973 | Getson | 260/31.2 R |
| 4,025,693 | 5/1977 | Milne | 428/447 |
| 4,080,190 | 3/1978 | Law et al. | 71/67 |
| 4,227,929 | 10/1980 | Law et al. | 106/1.17 |
| 5,017,322 | 5/1991 | Brooks | 264/255 |

FOREIGN PATENT DOCUMENTS

| | | |
|---|---|---|
| 1307001 | 1/1971 | United Kingdom . |
| 1581727 | 12/1980 | United Kingdom . |
| WO8000554 | 3/1980 | WIPO . |

*Primary Examiner*—D. S. Nakarani
*Attorney, Agent, or Firm*—George A. Kap; Thomas E. McDonnell

[57] ABSTRACT

A nontoxic antifouling system is provided at ambient conditions on a substrate which has a solid release layer bonded to a solid bonding layer which in turn is bonded to said substrate. The release layer has excellent release property and is bonded to the bonding layer. The bonding layer contains a component which is believed to react with the same or a similar component in the release layer to enhance the desired bond therebetween. The bonding layer is tougher than the release layer but its release property is inferior to that of the release layer.

21 Claims, No Drawings

NONTOXIC ANTIFOULING SYSTEMS

This application is a continuation of application Ser. No. 07/847,401, filed Mar. 6, 1992, now pending.

FIELD OF THE INVENTION

The present invention relates to a nontoxic antifouling system curable at room temperature which is composed of a release layer and a bonding layer secured to the release layer. The antifouling system has excellent release properties and it can be bonded directly to the bonding layer without any intermediate substance.

BACKGROUND OF INVENTION

Ship bottoms, buoys, fishing nets, and other structures submerged in seawater such as marine antifouling sheets and cooling water intake or discharge pipes are infested with organisms such as barnacles, tube worms and algae that attach to the surface of these structures and cause various troubles. It is routine practice to prevent the attachment of these marine fouling organisms by coating the surfaces of the aforementioned items with antifouling paints.

Organotins, and in particular tributyltins, have been the premier method of providing marine antifouling performance to organic paints. With the recent restrictions on the use of these toxic coatings in many countries, the boat and ship owners have fallen back to the technically inferior but less toxic copper oxide based coatings. The life of copper oxide based coatings rarely exceed 2 years in normal fouling conditions while the self-polishing tributyltinmethacrylate copolymers often exceeded 5 years. Also, coatings prepared from tributyltins can be pigmented in bright colors which had appeal for many boat and ship owners. Therefore, a dissatisfaction existed wherever the organotins were banned because copper oxide based coatings did not satisfy the needs of the boat and ship owners and operators.

Fouling control coatings based on silicone elastomers, such as polydimethylsiloxanes, have been known since the early 1970's. For instance, silicone-based formulations are disclosed in U.S. Pat. Nos. 4,025,693; 4,080,190; 4,227,929; and others. Also, Japanese patent application 96830/76 discloses an antifouling paint that uses a mixture of a silicone oil and an oligomer-like silicone rubber having terminal hydroxyl groups.

Silicones are based on polymers comprised of a backbone of silicon-oxygen-silicon atoms linked together. They are thus different chemically from organic materials which are mostly based on polymers composed of a backbone of carbon-to-carbon atoms linked together. It is this difference —the silicon-oxygen linkage—which accounts for the unique properties of silicones. The silicone bond linkage is similar to bond linkage found in other high temperature resistant materials such as quartz, glass and sand; hence the outstanding high temperature properties of room temperature vulcanizing (RTV) silicone rubber. This chemical makeup also accounts for the general inertness of RTV silicone rubber toward many deteriorating influences such as ozone, chemicals, weathering and radiation.

SUMMARY OF THE INVENTION

It is an object of this invention to bond a silicone rubber having excellent release properties to another silicone rubber which is tough but which has inferior release properties to that of the release silicone rubber.

It is another object of this invention to present a two-component system which can bind to a substrate and which provides excellent release properties.

It is another object of this invention to impart a quasi mechanical toughness to the release layer by the underlying silicone bonding rubber so that the release layer can withstand the necessary wear and tear which it otherwise does not have.

These and additional objects of this invention are accomplished by a room-temperature curable nontoxic antifouling system which includes a release layer and a bonding layer bonded together in a cured state, the release layer being fluid before cure and composed of an organopolysiloxane, an alkyl silicate, and a separate curing agent or catalyst; the bonding layer being fluid before cure and composed of an organopolysiloxane and a toughening component. The bonding layer includes a polyfunctional monomer to promote crosslinking. The bonding layer is curable by exposure to the atmosphere.

DETAILED DESCRIPTION OF INVENTION

The release layer is in the form of a fluid substance which can be applied by brushing, spraying, wiping, dipping or by any similar means as in the case of a paint. It is nontoxic, liquid silicone rubber composed of two components and can be cured to a solid state at room temperature to an elastomeric material. The first component is a fluid paint-like substance whereas the second component is a curing agent which is mixed with the first component before a cure is achieved. That is why it is designated as an RTV or room temperature vulcanizing. The release layer is composed of organopolysiloxane containing terminal silicon-bonded hydroxyl groups, an alkyl silicate, and a curing agent. On weight basis, the release layer mixture before cure is composed mainly of the organopolysiloxane, or preferably about 90–99%, less than 5% but more than 0.1% of the alkyl silicate, and less than 5% but exceeding 0.1% of the curing agent.

It has been known that the release layer has excellent release properties but it was not known how to bond it to another material. When a pressure-sensitive tape is adhered to the face of the release layer disposed on an aluminum plate measuring $7'' \times 12'' \times \frac{1}{4}''$ and weighing about 27 ounces, the tape readily releases from the surface when an attempt is made to lift the plate by the tape.

The release layer is a readily available commodity of commerce. Its useful temperature range is about $-50°$ to $+200°$ C., or a span of about $250°$ C. Although by itself it may not have sufficient abrasion resistance, the bonding layer imparts thereto toughness so that it has sufficient abrasion resistance and general toughness in any application it might be used. Based on actual tests, the release layer has much lower affinity for barnacle attachment than the bonding layer and significantly lower than polytetrafluoroethylene.

The bonding layer is also in the form of a fluid substance which can be applied to a substrate in the same manner as a paint. It is a one-component nontoxic silicone rubber and can be cured to a solid state at room temperature to an elastomeric material. The bonding layer is composed of organopolysiloxane and a polymeric toughening component. The bonding layer includes a polyfunctional monomer to promote crosslinking. In a preferred embodiment, on weight basis, the bonding layer fluid mixture is composed of 10–80% organopolysiloxane, especially 25–60%.and 30–80% toughening component, especially 40–70%. The bonding layer is curable by exposure to the atmosphere. The bonding layer does not adhere to a polytetrafluoroethylene sheet although the latter has better release properties than the bonding layer.

The antifouling system disclosed herein can be used on any marine surface to reduce or minimize fouling of the marine surface by a marine plant or animal. The system can be used as follows: the bonding layer is applied onto a substrate and allowed to semi-cure to a tacky surface. The application can be made in the same manner as a paint and the bonding layer thickness is about 15 to 250 microns and more typically 25 to 250 microns. A thicker bonding layer is wasteful. A thinner bonding layer may lack sufficient ruggedness. Semicure time of the bonding layer will depend on many factors, including the thickness of the layer and ambient temperature and humidity. Under normal conditions, the bonding layer can be semi- cured to a tacky surface in about one-half to 2 hours. The semi-cure time can be accelerated at an elevated temperature. When the bonding layer is tacky but not dry, the fluid release layer is applied directly over the bonding layer after being mixed with a curing agent. Again, thickness of the release layer will be about 20 or 25 to 1000 microns and more typically 50 to 1000 microns, depending on its method of application. The release layer may take 1 to 12 hours to dry, again depending on many factors. What is surprising here is the tenacious bond created between the bonding and the release layers which cannot be easily broken manually with a finger nail. The tenacious bond between the bonding and release layers is not obtained if the fluid release layer is applied to a fully cured bonding layer. It is also important to recognize that structural integrity of the release layer is enhanced by the bonding layer due to the strong interlayer forces. The toughness of the release layer is thus enhanced to the point of being more than sufficient for the intended applications of the antifouling system disclosed herein.

The adhesion between the bonding layer and the substrates can, however, be improved by known means such as by cleaning the surface of the substrate, by the use of a suitable primer, such as an epoxy primer (for example Gel Chem 820 ®), by the use of another substance to improve adhesion between the bonding layer and the substrate, and by other means.

Barnacle adhesion measurements provide an excellent method of assessing the foul release characteristics of a surface. A tensile and a shear force method have been developed for fluid applications and is designated ASTM D 3623-78 a(1987).

The barnacle provides an ideal candidate for adhesion measurements. It is a commonly occurring fouling organism found at most marine exposure sites, and if necessary, it can be reared under laboratory conditions to supplement the natural stocks. The adhesion mechanisms of both the cyprus larvae and adult have been studied and its ability to settle on most surfaces, including those with low surface energies such as polytetrafluoroethylene, make it a realistic test for surface evaluation.

The tensile force apparatus was developed to measure the adhesion strengths of large individual barnacles that settled on Navy test panels. Pursuant to the procedure, the soft tissues of the barnacle are excavated. A wire hook is then placed in the shell and set in place by a quick set epoxy. The test panel is held down and the wire hook is attached to a spring scale and tension is applied at a rate of 1 lb/second until barnacle detachment occurs. The tensile strength is then recorded.

The shear force apparatus was developed to measure adhesion strength of recently settle barnacles. A shear force is applied to the base of the barnacle by air pressure applied at the rate of about 1lb/second until the barnacle becomes detached and the force is then recorded.

As already noted, the release layer can be cured to a solid elastomeric material at room temperature of about 20° C. Before its cure, the release layer is fluid and can be applied in the same manner as a paint. The release layer comprises an organopolysiloxane containing terminal silicon-bonded hydroxyl groups, an alkyl silicate and a curing agent, such as Versamide 140 ®. It is believed that the concomitant presence of both an alkyl silicate and a certain group of metallic moiety supplied by the curing agent enables the release layer to be cured to a solid state at a relatively low temperature of about 20° C. The structure and characteristics of the release layer is described in U.S. Pat. No. 2,843,555, the entirety of which is incorporated herein by reference.

The type of linear, fluid organopolysiloxane convertible to the cured, solid, elastic state used in the release layer of the present invention is critical and must have end groups composed of silicon-bonded hydroxyl groups. For this purpose, it was found that starting materials corresponding to the general formula $(R'R''SiO)_n$ 

are made suitable for making the convertible hydroxy containing organopolysiloxanes containing silicon-bonded hydroxyl groups and are convertible to the cured, solid, elastic state where R' and R'' are organic radicals selected from the class consisting of alkyl radicals such as methyl, propyl, butyl and hexyl; aryl radicals such as phenyl, diphenyl and naphthyl; alkaryl radicals such as tolyl, xylyl and ethylphenyl; aralkyl radicals such as benzyl and phenylethyl; haloaryl radicals such as chlorophenyl, tetrachlorophenyl and difluorophenyl; alkenyl radicals such as vinyl and allyl; which are advantageously present in amounts less than 5 to 10% of the total number of silicon-bonded organic radicals in the starting materials, where n is an integer equal to at least 3 such as from about 3 to 10 or more, depending upon the organic group in the starting organopolysiloxane.

The above-described starting cyclic organopolysiloxanes are eminently suitable for preparing the convertible hydroxy-containing organopolysiloxanes used in the practice of the present invention because of the ability to readily obtain terminal silanol groups. In general, it is desirable and in some respects critical that of the organic groups present in the organopolysiloxanes, lower alkyl groups, specifically methyl groups, constitute at least 50%, preferably from about 70 to 100%, of the total number of organic groups attached to silicon by carbon-silicon linkages. For this purpose, it was found that in making the convertible organopolysiloxane fluids, cyclic polymers of dimethysiloxane are advantageously used for the purpose. Among such cyclic polymers may be mentioned, for instance, hexamethylcyclotrisiloxane, octamethylcyclotetrasiloxane, decamethylcyclosiloxane, etc. Obviously, mixtures of these cyclic organopolysiloxanes may be employed as long as the number of silicon-bonded methyl groups constitutes a major proportion of the total number of organic groups. Thus, one may employ, for instance, a mixture of octamethylcyclotetrasiloxane and a cyclic polymer of ethyl methylsiloxane having the formula

where n has the meaning above, mixtures of cyclic polymers of dimethysiloxane with cyclic methyl phenyl siloxane, cyclic methyl vinyl siloxanes, etc. When employing cyclic polymers of dimethysiloxane with other cyclic polymers in which the organic groups of the latter cyclic polymers are short, such as silicon-bonded ethyl and vinyl groups, the molar ratio of the latter two aliphatic hydrocarbons may be higher than when using longer chain aliphatic groups (e.g., from 3 to 6 carbon atoms in the chain) with the cyclic methyl polysiloxanes.

In preparing the hydroxy-containing organopolysiloxane fluid from the starting cyclic organopolysiloxane, the latter, which includes mixtures of cyclic organopolysiloxanes, is advantageously heated at temperatures of about 125° to 150° C. with small amounts of a siloxane rearrangement catalyst of about 0.001 to 0.01% by weight, based on the weight of the cyclic organopolysiloxane, such as potassium hydroxide, tetrabutyl phosphonium hydroxide, etc. The temperature and time at which this heating will take place will vary depending upon such factors as the type of organopolysiloxane employed, the siloxane rearrangement catalyst used, the concentration of the catalyst, the desired viscosity, etc. Certain siloxane rearrangement catalysts effect the desired polymerization of the organopolysiloxane more rapidly and at lower temperatures than others. In general, the polymerization is carried out for a time sufficient to obtain a high molecular weight product of about 100,000 to 2,000,000 centipoise viscosity when measured at 25° C.

The high molecular weight product thus obtained is then treated with water to reduce its molecular weight to a viscosity of from 1,000 to 50,000 centipoise at 25° C. This can be accomplished by blowing steam across the surface of the high molecular weight product or through the polymer for a sufficient time to give the lower viscosity material of about 1,000 to 50,000 centipoise having the desired silanol content. This product will have the general formula

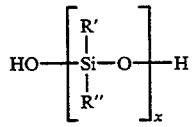

where R' and R" have the meanings given above and X is a whole number above 1 such as from 2 to 100 or more. There will be present two organic groups per silicon atom. The use of steam in this fashion will cause a decrease in the viscosity of the polymer while at the same time the formed linear polysiloxane will have the terminal silicon bonded hydroxy groups.

An alternative method for making the linear organopolysiloxane containing terminal silicon-bonded hydroxy groups comprises adding water to the high molecular weight polymer described above in such amount that when heated at elevated temperatures, for instance, 150 to 170° C., the viscosity is reduced to the desired level of 1,000 to 50,000 centipoise. The amount of water used will vary depending upon such factors as the molecular weight of the polymer being treated, the time and temperature at which the mixture of high molecular weight organopolysiloxane and water will be heated, the ultimate viscosity desired, etc.

The amount of water used to reduce the molecular weight can be readily determined. For instance, it has been found that one can obtain a linear fluid methylpolysiloxane containing terminal silicon-bonded hydroxy groups and having a viscosity of 1,000 to 2,000 centipoise by heating a high molecular weight methylpolysiloxane, prepared in accordance with the directions above, of about 2,000,000 centipoise viscosity, with 0.5% by weight thereof water for about 2 hours at 150° to 170° C.

One group of organic silicates which may be employed in the practice of the present invention, either unhydrolyzed or hydrolyzed liquid products, are those coming within the general formula:

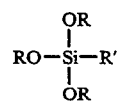

Such compounds may be varied depending on the definition of R and R' in the formula. Thus, for example, Rs may be individually selected from methyl, ethyl, propyl, isopropyl, butyl, amyl, isoamyl, octyl, iso-octyl, decyl, dodecyl,halogenated alkyls and beta-chloroethyl, radicals. R' may be the same as R including halogenated derivatives of alkyl groups, as for example, the chlorinated, brominated and fluorinated radicals, and the number of hydrogens on the alkyl group may, of course, be varied, for example, from 1 to 4 or more. In addition, R' may include alkyl and aryloxy groups corresponding to the general formula, —OZ, where Z is, for instance, an alkyl group of the same class described above for R' or additionally, Z may be an aryl, aralkyl, and alkaryl radical for example phenyl, tolyl, xylyl, benzyl, phenylethyl, naphthyl, anthracyl, biphenyl radical, as well as various halogenated derivatives of these aryl, aralkyl, and alkaryl radicals, attached to the silicon atom through the medium of an oxygen atom. Thus, the halogens may be attached to any position in the alkyl groups or in the aryl groups and may comprise any number of halogens. When halogen is attached to an alkyl group, either in the R or R' radical, it is preferable that the halogen should not be attached to the alpha carbon atom in order to attain improved stability of such substituted alkyl groups.

As examples of monomeric organo-silicon compounds, it is preferred to use organosilicates corresponding to the general formula (RO)$_4$Si, where R is an alkyl group as defined above. In addition to employing the liquid monomeric organosilicates described above in the practice of the present invention, liquid,partially hydrolyzed products derived therefrom can also be used. Such hydrolysis products are generally obtained by effecting partial hydrolysis in water of the particular monomeric organosilicate in the presence of small amounts of acid to a point where it is still water-insoluble and it is still possible to isolate a liquid, partially hydrolyzed organosilicon compound. Thus, taking as a specific example the controlled partial hydrolysis of ethyl silicate having the formula (C$_2$H$_5$O)$_4$Si, the hydrolysis of the latter may be carried out by adding acids or acid-forming metal salts to the liquid monomeric organosilicate, for instance, $FeCl_3$, $CuCl_2$, $AlCl_3$, $SnCl_4$, etc., and thereafter effecting suitable hydrolysis of this mixture of ingredients in water to obtain the two-phase composition from which the water-insoluble, partially hydrolyzed organosilicate can readily be separated from the aqueous phase and catalyst.

Only certain metallic salts of organic carboxylic acids may be employed in the practice of the present invention to give satisfactory cures. Examples of suitable acid radicals are those yielding the resinate, linoleate, stearate, oleate, or even the lower acid radicals such as those yielding the acetate, the butyrate, octoate, etc. Metallic salts of naphthenic acid are especially suitable. The metal ion of the metal salt is one selected from the class consisting of lead, tin, zirconium, antimony, and manganese. Examples of such salts may be, for instance, tin oleate, antimony octoate, tin butyrate, etc. The soluble salts, that is, salts which are soluble in the organopolysilicon containing terminal silicon-bonded hydroxy groups, are preferred, as, for example, lead and tin salts especially, because of their marked catalytic activity in combination with the alkyl silicate.

The amounts of the alkyl silicate and the metallic salt employed in the practice of the invention may be varied within fairly wide limits. Generally, it was found that the alkyl silicate is advantageously present, by weight, in an amount equal to from 0.1 to 5 to 10% or more, based on the weight of the organopolysiloxane containing the terminal silicon-bonded hydroxy groups, while the metal ion in the form of the metallic salt is present, by weight, in an amount equal to from 0.1 to 5% of the weight of the organopolysiloxane containing the terminal silicon-bonded hydroxy groups. With regard to the weight ratio between the alkyl silicate and the metallic salts, generally one may use, by weight, from 0.1 to 3 parts of the alkyl silicate.

Various fillers, pigments and other additives may be incorporated in the mixture of ingredients. Among such fillers are, for instance, titanium dioxide, lithopone, zinc oxide, zirconium silicate, silica aerogel, iron oxide, diatomaceous earth, calcium carbonate, fumed silica, precipitated silica, glass fibers, etc. The amount of filler used may obviously be varied within wide limits, for instance, from about 10 to about 300%, by weight of the filler, based on the weight of the organopolysiloxane containing the terminal silicon-bonded hydroxy groups. The exact amount of filler used will depend upon such factors as for instance, the application for which the organopolysiloxane is intended, the type of filler employed, the type of convertible organopolysiloxane employed, etc.

In order to prepare the release layer herein described, it is only necessary to mix the ingredients, preferably adding the metallic salt and the alkyl silicate last, since shortly after incorporation of these last ingredients in the organopolysiloxane containing the terminal silicon-bonded hydroxy groups, setting up of the mixture of ingredients will begin to take place. In a matter of a few minutes, a tight cure will begin to be noticed, and within one to two hours the ultimate cure at room temperature will be attained. The products thus derived have good tensile strengths and elongations and can be heated at elevated periods of time without any apparent decrease in the properties of the products.

The bonding layer can also be cured to a solid state at room temperature. The bonding layer is tougher than the release coat and can be bonded to a substrate such as metal, plastic, wood, concrete, and others. The plastic substrate includes fiber-reinforced plastic substrates. The bonding layer comprises organopolysiloxane containing the terminal silicon-bonded hydroxy groups, a toughening component, free radical initiator, a polyfunctional monomer to promote crosslinking, and a curing agent. The structure and characteristics of the bonding layer are described in U.S. Pat. No. 3,627,863 and 3,776,875, particularly the latter. The entirety of each of these patents is incorporated herein by reference.

The bonding layer may be prepared by contacting an organopolysiloxane containing the terminal silicon-bonded hydroxy groups with a polymerizable monofunctional monomer and a polymerizable polyfunctional monomer in the presence of a free-radical initiator under controlled conditions.

The organopolysiloxanes used in the grafting step may be represented by the formula:

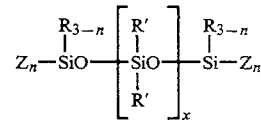

where in R(s), which may be the same or different, represent monovalent hydrocarbon radicals; R'(s), which may be same or different, represent monovalent hydrocarbon radicals, halogenated monovalent hydrocarbon radicals, or cyanoalkyl radicals; Z represents a functional group which may be hydrolyzable or condensable such as hydrogen, hydroxyl, halogen, amino, aminoxy, amido, oximo, aryloxy, acyloxy, or alkoxy groups; n is a number from 1 to 3 and x is a number from 1 to 20,000. In the above formula, R and R', which may be the same or different, represent organic alkyl radicals such as methyl, aryl radicals such as phenyl and tolyl, also R' may represent halogenated monovalent hydrocarbon radicals, such as chlorophenyl and the like.

Any organosiloxane polymer capable of forming free radicals or active sites by hydrogen abstraction and substantially free of any tendency to undergo further polymerization under the conditions employed may be used in the grafting step. Also, it is preferred that the siloxane polymer be substantially free of any aliphatic unsaturation; however, a low degree of any such unsaturation does not preclude the desired reaction even though it may set up a competitive reaction. Preferably, the organopolysiloxane should have lower alkyl radicals attached to the silicon atoms since these are more amenable to hydrogen abstraction than other radicals.

Examples of suitable organosiloxane polymers and copolymers which may be used in the formation of the modified polymers are hydroxyl-terminated siloxane fluids (OH-fluids), methylphenylsiloxane fluids, copolymers of dimethylsiloxane, and methylphenylsiloxaneor diphenylsiloxane units, and trimethylsiloxy endblocked polymers of dimethylsiloxanes. Hydroxyl-terminated siloxanes are preferred for room-temperature-curing applications.

Although the organopolysiloxanes used in the formation of the modified organopolysiloxanes may have a wide range of viscosities, it is preferred that the viscosity be from about 100 to 20,000 cps and more preferably from about 250 to 10,000 cps at 25° C.

The monofunctional monomer may be any polymerizable monoolefinic monomer. Examples of suitable olefinic compounds are low-molecular-weight, straight-chain hydrocarbons such as ethylene, propylene, butylene, halogenated straight-chain hydrocarbons, for example, vinyl halides, such as vinyl fluoride and vinyl chloride; vinyl esters, such as vinyl acetate; vinyl containing aromatics such as styrene, ring-substituted styrene, and other aromatics, such as vinylpyridine and vinylnaphthalene; unsaturated acids, such as acrylic acid and their derivatives, including the salts, esters, amides, and unsaturated nitriles, such as acrylonitrile, N-vinyl compounds, such as N-vinylcarbazole, N-vinylpyrrolidone, and N-vinylcaprolactam; and vinylsilicon compounds, such as vinyltriethoxysilane.

Disubstituted ,ethylenes of the type $CH_2=CX_2$ may be used which include vinylidene fluoride, vinylidene chloride, vinylidene cyanide, methacrylic acid, and compounds derived therefrom, such as the salts, esters, and amides as well as methacrolein, methacrylonitrile, and the like.

Disubstituted ethylenes of the type CHX—CHX, such as vinylene carbonate and various monomers which polymerize best in the presence of other monomers, e.g., maleic anhydride, esters of maleic and fumaric acids, stilbene, indene, and coumarone, may be used in the formation of these modified polymers.

The monofunctional monomer may also be a conjugated diolefin, such as 1,3-butadiene, isoprene, or chloroprene, inasmuch as the second double bond in these monomers is not readily available for cross-linking.

Monomers of the types mentioned above may be used singly or in combinations of two or three or even more in the grafting step. The properties of the modified product, of course, depend upon the nature of the monomeric materials as well as on the amounts used relative to the organosiloxane polymer.

The polyfunctional monomers must have a functionality of at least two. The term "polyfunctional" is intended to include difunctional and trifunctional monomers; that is, monomers having at least two nonconjugated olefinic linkages. Preferably, the olefinic groups should have nearly equal reactivity.

Examples of suitable polyfunctional monomers are esters, such as allyl methacrylate, allyl acrylate, diallyl adipate, methallyl acrylate, methallyl methacrylate, vinyl acrylate, vinyl methacrylate; ethers, such as divinyl ether of diethylene glycol; and hydrocarbons, such as divinylbenzene and vinyl-cyclohexene.

Especially suitable polyfunctional monomers are the polyol esters of acrylic and methacrylic acid, e.g., ethylene dimethacrylate, tetramethylene diacrylate, 1,3-butylene dimethacrylate, trimethylolpropane trimethacrylate, and pentaerythritol tetramethacrylate.

The amount of polyfunctional monomer employed in the formation of the cross-linked modified organopolysiloxanes is rather critical; however, the preferred range is from about 0.05 to about 5% and more preferably from about 0.1 to 1.0%, based on the weight of the monofunctional monomer. Where the amount of polyfunctional monomer exceeds the above limits, gelation of the system will occur.

The proportion of organopolysiloxane used in the grafting step may be varied within wide limits; however, it is preferred that the siloxane comprise from 25 to 60% by weight of the reactants. Higher proportions may be used but the properties of the resulting modified siloxane are inferior. When the siloxane content is below about 25% of the reactions, an unusable semisolid product may result.

In preparing the modified organopolysiloxanes of this invention, the grafting operation is the most expeditiously effected by using free-radical initiators, normally organic peroxides, although other free-radical initiators, normally organic peroxides, although other free-radical initiators, such as azo-compounds may be used. Ionizing radiation may also be used to bring about the formation of free radicals.

The most suitable peroxide initiators are compounds of the formula ROOH, ROOR, or RCOOOR in which R is an organic radical. Specific examples of peroxides which are operative in this invention are hydroperoxides, such as t-butyl hydroperoxide, cumene hydroperoxide, and decalin hydroperoxide; dialkyl peroxides, such as di-t-butyl and dicumyl peroxide; cyclic peroxides, such as ascaridole and 1,5-dimethylhexane-1,5-peroxide; peresters such as t-butyl perbenzoate, t-butylperoxy isopropyl carbonate, and t-butyl peroctoate; keto peroxides, such as acetone peroxide and cyclohexanone peroxide. Diacyl peroxides such as benzoyl peroxide may also be used.

The amount of free-radical initiator used is not critical. As little as 0.05% of the more active peroxide initiators, based on the weight of the monomers, is adequate in most cases. Where it is desirable to increase the reaction rate, as much as 3% or even more of the initiator may be used.

Although the temperature employed is not critical, it is preferred that the grafting and cross-linking be conducted at temperatures below about 150° C. and more preferably at temperatures between about 50° and 150° C.

The preparation of the modified organopolysiloxanes may occur in the presence or absence of an inert organic solvent. Where reactive monomers are used in the grafting operation, a volatile organic solvent may be used to control the temperature by evaporation and reflux. Any organic solvent boiling within range of from 50° to about 150° C. and having a relatively low chain transfer constant may be used in the grafting step.

Examples of suitable solvents are aromatic hydrocarbons such as benzene, toluene, xylene; chlorinated aromatic hydrocarbons, such as chlorobenzene; aliphatic hydrocarbons, such as pentane, hexane, octane; cycloaliphatic hydrocarbons, such as 1,1-dimethylcyclopentane, and cyclohexane. Other solvents which may be used are esters such as methyl acetate, ethyl acetate, propyl acetate, n-butyl acetate, amyl acetate, isoamyl acetate, methyl butyrate, and ethyl valerate.

When a solvent is used, it should be within the range of from about 2 to about 50%, preferably from about 10 to 40% by weight of the composition, e.g., solvent and reactants.

Grafting and cross-linking normally occur simultaneously, particularly when all of the polyfunctional monomer is present during the initial grafting step. In another embodiment, the polyfuntional monomer may be added to the grafted composition after the initial grafting has occurred; in this case, then the cross-linking occurs as a separate step. In either case, only the dispersed particular matter is cross-linked, and the bulk of the material remains fluid. The products, where desirable, may be separated from the unreacted monomers by any conventional technique known in the art, such as by distillation, solvent extraction, or selective solvent fractionation.

It will be understood that in a grafting operation, part of the original organopolysiloxane may remain ungrafted. Also there may be present as byproduct a certain amount of organic homopolymer which is not bonded to the organopolysiloxane. The terms "grafted organopolysilxane" or "graft-modified polymer" as used here refer to the entire polymeric composition, in which part or all of the organic polymer is bonded to the organopolysiloxane polymer, and which may contain ungrafted organopolysiloxanes.

The modified organoploysiloxanes thus prepared may be used as room-temperature-curable elastomers. For example, in a one-component system, the modified polymer may be endblocked with groups which are hydrolyzable in ambient moisture. Silanes of the general formula $X_{4-m}SiY_m$ wherein X is a relatively unreactive group, such as alkyl, or aryl; Y is an acryloxy, oximo, alkoxy, aryloxy, halogen, aminoxy, amido, or phosphate group; and m is an integer of from 3 to 4, are added as endblocking agents to hydroxyl-terminated modified organopolysiloxane, thereby replacing the hydroxyl groups with functional groups of the type $OSiX_{4-m}Y_{m-1}$. Examples of these silanes are methyltriacetoxysilane, isopropyltriacetoxysilane, isopropoxytriacetoxysilane, methyltris(diethylphosphato)silane, and the like.

Generally, the endblocking agent is added to the modified organopolysiloxanes immediately after their formation while the same are still hot or at least warm. Under these conditions, the terminal hydroxyl groups carried by the modified organopolysiloxane are converted to hydrolyzable functional groups. These compositions can be cured by merely exposing them to atmospheric moisture with or without any additional water vapor. Upon exposure to moisture, the compositions are cured at times varying from a few minutes to several hours or days.

In the two-component system, hydroxyl -terminated modified organopolysiloxanes are mixed with curing agents, such as polyalkoxysilanes of formula $(R''O)_z SiR'''_{4-z}$ or polyalkoxysiloxanes in which the silicon atoms are linked through Si—O—Si linkages and the remaining valences of the silicon atom are satisfied by R''O and R'''. In the above formula, the groups represented by R'' and R''' are monovalent hydrocarbon radicals having less than eight carbon atoms, and z has a value of from 3 to 4. Examples of monovalent hydrocarbons radicals are methyl, ethyl, propyl, butyl, hexyl, phenyl, vinyl, allyl, ethylallyl, butadienyl, and the like. The polyalkoxysiloxanes used herein include monoorganotrihydrocarbonoxysiloxanes, tetrahydrocarbonoxysilanes, alkyl silicates, and partial hydrolyzates of such silanes. The polyalkoxy compounds, e.g., ethyl orthosilicate or partially hydrolyzed ethyl silicates, such as Ethyl Silicate 40, which consists primarily of decaethyl tetrasilicate, are representative examples of these compounds. Other operative curing agents are ethyltrimethoxysilane, methylbutoxydiethoxysilane, propyltripropoxysilane, ethyl orthosilicate, and n-butyl orthosilicate. Examples of alkyl polysilicates are ethyl polysilicate, isopropyl polysilicate, butyl polysilicates, dimethyltetraethoxydisiloxane, trimethylpentabutoxytrisiloxane, and the like.

The polyalkoxysilanes and polyalkysiloxanes employed herein may be used either alone or in combination. They should be used in a proportion of from about 0.5 to about 20% or preferably from about 1 to 10% by weight based on the weight of the organopolysiloxane. If the total weight of the polyalkoxysilanes or polyalkysiloxanes employed is below about 0.5% based on the weight of the modified organopolysiloxanes, the cure rate is extremely slow. If, on the other hand, the total weight of the polyalkysiloxanes is about 10% based on the weight of the modified organopolysiloxanes, the cure time will not be substantially reduced.

The modified organopolysiloxane compositions are cured by mixing the hydroxyl-terminated organopolysiloxanes with the polyalkoxysilanes or the polyalkoxysiloxanes in the presence of a catalyst, preferably a metallic salt or compound. The metallic component of the catalyst is preferably tin, but may be lead, chromium, antimony, iron, cadmium, barium, calcium, titanium, bismuth, or magnesium. Examples of suitable salts are tin naphthenate, lead octoate, tin octoate, iron stearate, tin oleate, antimony octate, tin butyrate, and the like. Organotin catalysts which may be used include dibutyltin dilaurate, bis(dibutylphenyltin) oxide, bis(acetoxydibutyltin) oxide, bis(tributyltin) oxide, dibutoxydibutyltin, tri-t-butyltin hydroxide, triethyltin hydroxide, diamyldipropoxytin, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxychloride, and the like. These catalysts may be dispersed in a solvent and then added to the hydroxyl-terminated modified organopolysiloxanes or they may be dispersed on a suitable filler or additive and thereafter milled with a modified polymer. Examples of suitable hydrocarbon solvents are benzene, toluene, xylene, and the like. Also, halogenated hydrocarbons, such as tetrachloroethylene or chlorobenzenes; organic ethers, such as diethyl ether, dibutyl ether, and the like; and hydroxyl-free fluid polysiloxanes may be used as solvents. It is preferred that the solvent used for dispersing the catalyst be the same or at least miscible with the solvent used in the formation of the modified organopolysiloxanes. Also, the solvent should be sufficiently volatile to evaporate at room temperature.

These modified organopolysiloxanes may be compounded in the usual manner for preparing conventional siloxane elastomers. However, when the materials are stored prior to use it is essential that catalyst or the polyalkoxysilane or polyalkoxysiloxane curing agent be stored separately. In other words, the hydroxyl-terminated modified organopolysiloxanes, curing agent, and filler, if desired, may be compounded and the catalyst added just prior to use. In another method, the amount of the organopolysiloxane, catalyst, and filler, if desired, may be compounded and a curing agent added just prior to use. Where an inert filler is used, it may be added to either the hydroxyl-terminated modified organopolysiloxane or the curing agent prior to the addition of the catalyst or immediately after the reactants have been combined. Upon mixing these ingredients, the compositions cure spontaneously at room temperature.

The amount of catalyst used in these curing systems may range from 0.05 to about 2% by weight, preferably from about 0.1 to about 1% by weight based on the weight of the composition. A mixture of two or more of the catalysts mentioned above may be used, if desired. The amount of catalyst added to the base composition is determined by the requirements of the particular job, especially the pot life or working time required. For example, in caulking, a working time of 1 to 2 hours is required; thus an amount of catalyst is added that will not result in any substantial stiffening of the caulking composition in a shorter time. Normally, the composition is tack-free within 2 to 4 hours following the caulking operation and substantially cured after about 24 hours and completely cured after about 7 days. The period of time may vary somewhat with changes in humidity and temperature.

Although not essential, fillers may be incorporated in these modified organopolysiloxane compositions. Examples of suitable fillers are fumed silicas, high-surface-area precipitated silicas, and silica aerogels, as well as coarser silicas, such as diatomaceous earth, crushed quartz, and the like. Other fillers which may be used are metallic oxides, such as titanium oxide, ferric oxide, zinc oxide, fibrous fillers, such as asbestos, fiberous glass, and the like. Organic fillers having a thixotropic effect, such as lithium stearate and Thixcin R, a castor oil derivative, may be used. Additives, such as pigments, antioxidants, ultraviolet absorbers, and the like, may be included in these compositions.

The cross-linked organopolysiloxanes are resistant to the solubilizing effect of solvents. That is, solvents which normally dissolve equivalent uncross-linked particulate matter have only a slight swelling effect on the cross-linked particulate matter. In addition, the uncross-linked system in the presence of about 50% toluene will change abruptly from a Newtonian liquid to a gel like mass with a loss of definitive particulate matter. In the cross-linked system there is a gradual reduction in Newtonian viscosity up to about 75% toluene. Above this concentration, the solution becomes thixotropic and again above about 90% toluene returns to a Newtonian liquid. Examination of the cross-linked material shows the presence of definitive particulate matter with only slight swelling of the particles. Upon removal of the solvent, the material returns to its original physical state, viz a liquid.

The invention disclosed herein is illustrated by the following examples which are given by way of illustration and not by way of limitation.

EXAMPLE 1

This example describes preparation of a release layer which is characterized by exceptional surface release property.

100 parts of octamethylcyclotetrasiloxane was heated for about 2 to 4 hours at a temperature of about 140° C. with about 0.01% by weight of potassium hydroxide until a highly viscous mass bordering on a gummy solid was obtained. This linear, long-chain methylpolysiloxane had a viscosity of about 2,000,000 centipoises(cps) and had a ratio of approximately two methyl groups per silicon atom. This high molecular weight methylpolysiloxane was mixed with 0.5% by weight thereof water, and the mixture of ingredients was heated with stirring for two hours at 150° to 175° C. until a product having a viscosity of about 2,000 centipoises at about 30° C. was obtained. This material was a linear, fluid methylpolysiloxane having terminal silicon-bonded hydroxyl groups.

To 100 parts of this low molecular weight polymer were added 20 parts diatomaceous earth, 20 parts zinc oxide and 30 parts calcined clay. To the above mixture of ingredients were added 2 parts of a liquid, water-insoluble hydrolysis product of partial tetra-ethyl silicate and 2 parts tin octoate or 0.6 weight part tin. The latter polyethyl silicate is commercially available as Ethyl Silicate 40 and is a mixture of ethyl polysilicates having about 40% available silica and is derived from the controlled hydrolysis of tetraethyl silicate, the formula for said polyethyl silicate being described as follows:

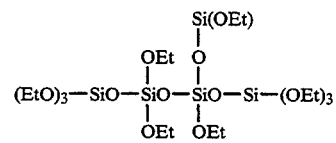

where Et represents the $C_2H_5$ group.

The above mixture of ingredients became elastic in approximately 60 seconds after mixing, whereas before this time it was readily deformable incoherent mass, and set to a firm, rubbery product having good strength and elongation in about 5 minutes. The tensile strength after 24 hours at room temperature was 372 psi the elongation was 170%, and the Shore A hardness was 40. It was capable of being heated at 250° C. for 24 hours without apparent change in physical properties.

EXAMPLE 2

This example demonstrates preparation of the bonding layer which contains the organopolysiloxane with terminal silicon-bonded hydroxyl, a component which is believed to bond through the same or similar component in the release layer.

To reactor were introduced 437.2 parts of styrene, 1,256.1 parts of butyl acrylate, 1.7 parts of 1,3-butylene dimethacrylate, 1,128.9 parts of 400 c.p. hydroxyl-terminated polydimethylsiloxane and 8.47 parts of di-t-butyl peroxide. The reactor was purged with nitrogen and the reactants heated at 126°–130° C. for 4 hours with agitation. The unreacted monomers were removed at elevated temperature under a vacuum of about 1 mm Hg or less.

About 50 parts of the liquid product was mixed with about 1.5 parts of Ethyl Silicate "40" and 0.5 parts of dibutyltin butoxychloride, poured into a mold and cured at room temperature at relative humidity of from 30 to 70% for 7 days.

EXAMPLE 3

This example demonstrates the bonding between the release and bonding layers, as disclosed herein.

A clean surface of an aluminum plate measuring $7'' \times 12'' \times \frac{1}{4}''$ was coated with a brush with a fluid elastomeric bonding layer designated as Silgan ®J-501. This bonding layer was fluid as a paint and was of a grey color. This bonding layer is a commercial commodity which can be obtained from Wacker Silicones Corporation. The Wacker technical product brochure on the bonding layer states that this material is a dispersion which cures at room temperature on contact with atmospheric moisture which can liberate s-butylamine and naphtha. On curing at room temperature, a coating is formed which makes it possible to handle gently in 2 to 3 hours with full cure achieved in about 24 hours at 50% relative humidity.

The product brochure discloses that on cure, this material becomes tough, remains flexible to −80° C., has Durometer Shore A hardness of 75, has tensile strength of 500 lbs/in²., elongation of 60%, tear strength 35 lbs/in²., and a service temperature of 125° C. This brochure also discloses that for most applications, adhesion of this material to clean, dry surfaces is good and primers can be used for increased adhesion.

Thickness of the bonding layer disposed on the aluminum plate was about 250 microns and it semi-cured at room temperature in about one hour to a tacky elastomeric bonding layer.

A release layer was then brushed over the bonding layer. The release layer is a white fluid, like a paint, two-component commercial silicone rubber which is a product of General Electric Company and bears the designation of RTV 11. Before application to the bonding layer, the release layer of RTV 11 material was mixed with a curing agent which was provided. The release layer was about 500 microns in thickness and cured to a solid, elastomeric material overnight.

The release layer tenaciously bonds to the bonding layer on curing so that the bond cannot be broken with a finger nail. The bond between the release layer and the bonding layer was completely unexpected because for a long time, those skilled in the art did not know of a way to bond a release layer to another surface although the property of the release layer was well known.

Strong interlayer forces between the release and bonding layers increase toughness of the release layer with the result that in the antifouling system described herein, toughness in general of the release layer is more than sufficient for the intended applications. This conclusion is made on the basis of comparisons made on the unsupported release layers, such as release liners in molds, where the release layer readily disintegrates on manual mastication. The release property of the release layer appears to be excellent in the case of the antifouling system disclosed herein based on field experiments with barnacle adhesion.

It is believed that the hydroxyl-terminated organopolysiloxanes in the bonding and the release layers provide the adhesion between the two layers in a cured state. It is believed that a reaction takes place between the same or similar components in the two layers with the result of providing the desired adhesion between the two layers.

What I claim:

1. An article comprising a substrate, a silicone rubber bonding layer of about 15 microns or more in thickness which is a reaction product comprising an organopolysiloxane containing terminal silicon-bonded hydroxyl groups and a polymerizable vinyl aromatic compound bonded to said substrate; and a silicone rubber release layer of about 20 microns or more in thickness which is a reaction product comprising an organopolysiloxane containing terminal silicon-bonded hydroxyl groups bonded to said bonding layer, said release layer is characterized by quasi mechanical toughness that is imparted to said release layer by said bonding layer which said release layer does not have in absence of said bonding layer, said release layer is damaged when an attempt is made to separate it from said bonding layer, said release layer has better release properties than polytrafluoroethylene, and the bond between said bonding layer and said release layer cannot be broken manually by a finger nail.

2. The article of claim 1 wherein the vinyl aromatic compound is styrene.

3. The article of claim 2 wherein said bonding layer is a reaction product comprising 25–60 weight percent of the organopolysiloxane and 40–70 weight percent of vinyl aromatic compound, based on the weight of said bonding layer; and said release layer is a reaction product comprising 90–99 weight percent of the organopolysiloxane, 0.1–5 weight percent alkyl silicate, and 0.1–5 weight percent curing agent, based on the weight of said release layer.

4. The article of claim 3 wherein the organopolysiloxane of said release layer contains organic groups and terminal silicon-bonded hydroxyl groups and has viscosity in the range of about 1,000 to 50,000 cps at 25° C.; organic groups in the organopolysiloxane of said release layer are selected from the group consisting of monovalent hydrocarbon radicals and halogenated aryl radicals, the organic groups are attached to the organopolysiloxane by means of carbon-silicon bonds; the alkyl silicate of said release layer is selected from the group consisting of (a) monomeric organosilicates defined by the formula:

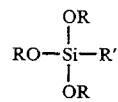

where R and R' are individually selected from the group consisting of alkyl groups and halogen-substituted alkyl groups, and R' additionally is selected from the group consisting of aryl, aralkyl, alkaryl, alkoxy, aryloxy groups, and halogenated derivatives thereof, and (b) partial hydrolysis products of the monomeric organosilicates; the organopolysiloxane of said bonding layer has viscosity in the range of 1,000 to 20,000 cps at 25° C. in which the organo groups are free of alkenyl radicals and are selected from the group consisting of monovalent hydrocarbon radicals, halogenated monovalent hydrocarbon radicals and cyanoalkyl radicals; the organopolysiloxane of said bonding layer having at least one polymeric organic side chain grafted thereto; the vinyl aromatic compound is polymerized with at least one polyfunctional monomer; said bonding layer contains cross-linked particulate matter generated in situ.

5. The article of claim 4 wherein the organopolysiloxane in said release and said bonding layers is defined by the formula:

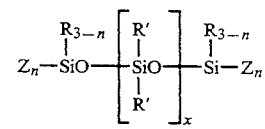

where the R groups are individually selected from the group consisting of monovalent hydrocarbon radicals containing 1 to 6 carbon atoms; the R' groups are individually selected from the group consisting of monovalent hydrocarbon radicals containing 1 to 6 carbon atoms, halogenated hydrocarbon radicals containing 1 to 6 carbon atoms, and cyanoalkyl radicals containing 1 to 6 carbon atoms; the Z groups are hydrolyzable by ambient moisture or are condensable and are individually selected from the group consisting of hydroxyl, halogen, amino, amido, aminoxy, oximo, aryloxy, acyloxy, alkoxy, and phosphate groups; n is a number from 1 to 3; and x is a number from 1 to 20,000.

6. Article of claim 5 wherein said bonding layer is bonded on one side to said substrate and on the opposite side to said release layer; said bonding layer is also prepared in the presence of 0.1–20 wt % of a curing agent, based on the weight of said bonding layer; said curing agent is selected from the group consisting of polyalkoxysilanes of the formula $(R''O)_zSiR'''_{4-z}$, polyalkoxysiloxanes in which the silicon atoms are linked through Si—O—Si linkages and the remaining valences of the silicon atom are satisfied by $R''O$ and $R'''$ groups, metallic salts, and mixtures thereof, where $R''$ and $R'''$ are individually selected from the group consisting of monovalent hydrocarbon radicals of 1–8 carbon atoms and z is 3 or 4.

7. The article of claim 6 wherein said substrate is selected from the group consisting of metal, wood, plastic, concrete, and mixtures thereof; Zs in the organopolysiloxane are hydroxyl groups; maximum thickness of said bonding layer is about 250 microns; and maximum thickness of said release layer is about 1000 microns.

8. The article of claim 1 wherein the vinyl aromatic compound is polymerized with a monofunctional monomer selected from the group consisting of polymerizable straight-chain hydrocarbons of 2–6 carbon atoms, halogenated straight-chain hydrocarbons of 2–6 carbon atoms, vinyl esters of 2–6 carbon atoms, unsaturated acids of 2–6 carbon atoms, N-vinyl compounds and vinylsilicone compounds.

9. The article of claim 1 wherein said bonding layer is a reaction product comprising hydroxyl-terminated polydimethylsiloxane, styrene and butyl acrylate.

10. The article of claim 1 wherein said bonding layer is a reaction product of hydroxyl-terminated polydimethylsiloxane, styreno and a monofunctional monomer selected from the group consisting of polymerizable straight-chain hydrocarbons of 2–6 carbon atoms, halogenated straight-chain hydrocarbons of 2–6 carbon atoms, vinyl esters of 2–6 carbon atoms, unsaturated acids of 2–6 carbon atoms, and N-vinyl compounds.

11. The article of claim 10 wherein said bonding layer is a reaction product comprising a polyfunctional monomer in amount of 005–5% based on the weight of the monofunctional monomer.

12. The article of claim 1 wherein said vinyl aromatic compound is selected from the group consisting of styrene, vinylpyridine and vinylnaphthalene.

13. An article comprising a substrate, a silicone rubber bonding layer bonded to said substrate, and a silicone rubber release layer bonded to said bonding layer; said bonding layer is a reaction product comprising an organopolysiloxane, a monofunctional monomer selected from the group consisting of vinyl aromatic compounds, a polyfunctional monomer selected from the group consisting of monomers having functionality of at least two, a free radical initiator selected from the group consisting of organic peroxide initiators, and a curing agent; said release layer is a reaction product comprising an organopolysiloxane containing terminal silicon-bonded hydroxyl groups.

14. The article of claim 13 wherein said bonding layer is prepared from, based in the weight of the following bonding components:
 (a) 10–80 weight percent of the organopolysiloxane containing terminal silicon-bonded hydroxyl groups,
 (b) 30–80 weight percent of the monofunctional monomer and the polyfunctional monomer wherein amount of the polyfunctional monomer is 0.05–5 weight percent, based on the weight of the monofunctional monomer;
 (c) 0.05–3 weight percent of the initiator, and
 (d) 0.1–20 weight percent of the curing agent.

15. The article of claim 13 wherein said bonding layer is prepared from, based on the weight of the following bonding layer components:
 (a) 25–60 weight percent of the organopolysiloxane,
 (b) 40–70 weight percent of the monofunctional monomer and the polyfunctional monomer wherein amount of the polyfunctional monomer is 0.1–1 weight percent, based on the weight of the monofunctional monomer,
 (c) 0.05–3 weight percent of the initiator, and
 (d) 0.1–20 weight percent of the curing agent.

16. The article of claim 15 wherein said release layer is prepared from, based on the weight of the following release layer components:
 (1) 90–99 weight percent of the organopolysiloxane,
 (2) 0.1–5 weight percent alkyl silicate, and
 (3) 0.1–5 weight percent curing agent.

17. The article of claim 16 wherein the monofunctional monomer is styrene; wherein the polyfunctional monomer is selected from the group consisting of polyol esters of acrylic acid and methacrylic acid; and wherein the vinyl aromatic compound is polymerized with a monofuctional monomer selected from the group consisting of polymerizable straight-chain hydrocarbons of 2–6 carbon atoms, halogenated straight-chain hydrocarbons of 2–6 carbon atoms, vinyl esters of 2–6 carbon atoms, unsaturated acids of 2–6 carbon atoms, N-vinyl compounds and vinylsilicone compounds.

18. The article of claim 13 wherein said vinyl aromatic compound is selected from the group consisting of styrene, vinylpyridine and vinylnaphthalene.

19. An article comprising a substrate, a silicone rubber bonding layer of about 15 microns or more in thickness which is a reaction product comprising an organopolysiloxane and a polymerizable vinyl aromatic compound bonded to said substrate; and a silicone rubber release layer of about 20 microns or more in thickness which is a reaction product comprising an organopolysiloxane bonded to said bonding layer, the organopolysiloxane in said bonding layer and in said release layer contains terminal silicon-bonded hydroxyl groups, said release layer has better release properties than polytrafluoroethylene, said release layer is characterized by quasi mechanical toughness that is imparted to said release layer by said bonding layer which said release layer does not have in absence of said bonding layer, said release layer is damaged when an attempt is made to separate it from said bonding layer, and the bond between said bonding layer and said release layer cannot be broken manually by a finger nail.

20. The article of claim 17 wherein said vinyl aromatic compound is selected from the group consisting of styrene, vinylpyridine and vinylnaphthalene.

21. An article comprising a substrate, a silicone rubber bonding layer of about 15 microns or more in thickness which is a reaction product comprising an organopolysiloxane containing terminal silicon-bonded hydroxyl groups and styrene bonded to said substrate; and a silicone rubber release layer of about 20 microns or more in thickness which is a reaction product comprising an organopolysiloxane containing terminal silicon-bonded hydroxyl groups bonded to said bonding layer, said release layer is characterized by quasi mechanical toughness that is imparted to said release layer by said bonding layer which said release layer does not have in absence of said bonding layer, said release layer is damaged when an attempt is made to separate it from said bonding layer, said release layer has better release properties than polytrafluoroethylene, and the bond between said bonding layer and said release layer cannot be broken manually by a finger nail.

* * * * *